United States Patent
Richardson et al.

(10) Patent No.: US 9,950,759 B2
(45) Date of Patent: *Apr. 24, 2018

(54) REINFORCEMENT STRUCTURE AND METHOD EMPLOYING BULKHEADS

(71) Applicant: Zephyros, Inc., Romeo, MI (US)

(72) Inventors: Henry E. Richardson, Washington, MI (US); Gary Vanlerberghe, Melvin, MI (US); Dean Schneider, Washington, MI (US)

(73) Assignee: ZEPHYROS, INC., Romeo, MI (US)

( * ) Notice: Subject to any disclaimer, the term of this patent is extended or adjusted under 35 U.S.C. 154(b) by 356 days.

This patent is subject to a terminal disclaimer.

(21) Appl. No.: 14/629,542

(22) Filed: Feb. 24, 2015

(65) Prior Publication Data

US 2015/0166136 A1   Jun. 18, 2015

Related U.S. Application Data

(63) Continuation of application No. 12/257,636, filed on Oct. 24, 2008, now Pat. No. 8,966,766.
(Continued)

(51) Int. Cl.
*B62D 27/02* (2006.01)
*B62D 65/02* (2006.01)
(Continued)

(52) U.S. Cl.
CPC .......... *B62D 65/02* (2013.01); *B62D 29/002* (2013.01); *B62D 29/041* (2013.01);
(Continued)

(58) Field of Classification Search
CPC ... B23P 2700/50; B62D 65/02; B62D 65/024; B62D 65/04; B62D 65/041;
(Continued)

(56) References Cited

U.S. PATENT DOCUMENTS

| 4,400,105 A | 8/1983 | Yeager et al. |
| 4,463,870 A | 8/1984 | Coburn et al. |
| 5,755,486 A * | 5/1998 | Wycech ................. B29C 70/66 296/187.02 |
| 5,800,896 A | 9/1998 | Kobayashi |
| 5,884,960 A | 3/1999 | Wycech |
| 6,053,564 A | 4/2000 | Kamata et al. |
| 6,131,897 A | 10/2000 | Barz et al. |

(Continued)

FOREIGN PATENT DOCUMENTS

| DE | 20 2004 009 473 U1 | 10/2004 |
| EP | 1 149 679 A | 10/2001 |

(Continued)

OTHER PUBLICATIONS

Co-pending U.S. Appl. No. 11/781,587, filed Jul. 23, 2007; Published as US 2008/0023987 A1 dated Jan. 31, 2008.
(Continued)

*Primary Examiner* — Christopher Besler
(74) *Attorney, Agent, or Firm* — The Dobrusin Law Firm, PC

(57) ABSTRACT

A structural reinforcement device for insertion into a cavity of a structure and method for making the same including a first reinforcement section that has at least one projection of a first expandable polymeric material secured to it; and a separate second reinforcement section mated with the first reinforcement section, the second reinforcement section being configured to include at least one cavity, into which the at least one projection penetrates upon mating, and at least one aperture defined therein through which the expandable material flows during expansion and where it will remain upon curing of the material, thereby causing the first reinforcement section to be coupled with the second reinforcement section.

20 Claims, 5 Drawing Sheets

Related U.S. Application Data

(60) Provisional application No. 60/982,565, filed on Oct. 25, 2007.

(51) Int. Cl.
  *B62D 29/00* (2006.01)
  *B62D 29/04* (2006.01)

(52) U.S. Cl.
  CPC ....... *B62D 27/023* (2013.01); *Y10T 29/49622* (2015.01); *Y10T 29/49632* (2015.01); *Y10T 29/49634* (2015.01)

(58) Field of Classification Search
  CPC .. B62D 29/002; B62D 29/005; B62D 27/023; E04C 2003/042; E04C 2003/0408; E04C 3/29; E04C 3/294; F16B 2/04; F16B 2001/0078; F16B 17/008
  See application file for complete search history.

(56) References Cited

U.S. PATENT DOCUMENTS

| | | | |
|---|---|---|---|
| 6,166,588 A | 12/2000 | Wycech | |
| 6,186,581 B1 | 2/2001 | Onoue | |
| 6,199,940 B1 | 3/2001 | Hopton et al. | |
| 6,235,367 B1 | 5/2001 | Holmes et al. | |
| 6,305,136 B1 | 10/2001 | Hopton et al. | |
| 6,311,452 B1 | 11/2001 | Barz et al. | |
| 6,348,513 B1 | 2/2002 | Hilborn et al. | |
| 6,354,656 B1 | 3/2002 | Hwang | |
| 6,368,438 B1 | 4/2002 | Chang et al. | |
| 6,419,305 B1 | 7/2002 | Larsen | |
| 6,422,575 B1 | 7/2002 | Czaplicki et al. | |
| 6,467,384 B1 | 10/2002 | Bromley | |
| 6,474,726 B1 | 11/2002 | Hanakawa et al. | |
| 6,519,854 B2 | 2/2003 | Blank | |
| 6,523,884 B2 | 2/2003 | Czaplicki et al. | |
| 6,607,239 B1 | 8/2003 | Fuji | |
| 6,619,727 B1 | 9/2003 | Barz et al. | |
| 6,695,366 B2 | 2/2004 | Cherry | |
| 6,786,533 B2 | 9/2004 | Bock et al. | |
| 6,793,274 B2 | 9/2004 | Riley et al. | |
| 6,811,864 B2 | 11/2004 | Czaplicki et al. | |
| 6,880,657 B2 * | 4/2005 | Schneider | B62D 29/002 180/68.5 |
| 6,890,021 B2 | 5/2005 | Bock et al. | |
| 6,920,693 B2 | 7/2005 | Hankins et al. | |
| 6,928,736 B2 | 8/2005 | Czaplicki et al. | |
| 6,935,681 B2 | 8/2005 | Hasler et al. | |
| 6,938,947 B2 | 9/2005 | Barz et al. | |
| 6,941,719 B2 | 9/2005 | Busseuil et al. | |
| 6,953,219 B2 | 10/2005 | Lutz et al. | |
| 6,988,763 B2 | 1/2006 | Saeki | |
| 7,025,409 B2 | 4/2006 | Riley et al. | |
| 7,111,899 B2 | 9/2006 | Gray | |
| 7,125,461 B2 | 10/2006 | Czaplicki et al. | |
| 7,147,272 B2 | 12/2006 | Odaka et al. | |
| 7,152,914 B2 | 12/2006 | Dingman et al. | |
| 7,192,071 B2 | 3/2007 | Watanabe et al. | |
| 7,199,165 B2 | 4/2007 | Kassa et al. | |
| 7,249,415 B2 | 7/2007 | Laren et al. | |
| 7,290,828 B2 | 11/2007 | Kosal et al. | |
| 7,318,873 B2 | 1/2008 | Czaplicki et al. | |
| 7,401,846 B2 | 7/2008 | Browne et al. | |
| 7,469,459 B2 | 12/2008 | Kosal et al. | |
| 7,673,930 B2 | 3/2010 | Stratman | |
| 7,735,906 B2 | 6/2010 | Takahashi et al. | |
| 8,020,924 B2 | 9/2011 | Niezur et al. | |
| 8,361,589 B2 | 1/2013 | Kraushaar | |
| 8,388,037 B2 | 3/2013 | LaNore et al. | |
| 8,966,766 B2 * | 3/2015 | Richardson | B62D 29/002 29/897.2 |
| 2002/0033617 A1 | 3/2002 | Blank | |
| 2002/0059759 A1 | 5/2002 | Bielefeld | |
| 2002/0174954 A1 | 11/2002 | Busseuil et al. | |
| 2002/0190541 A1 | 12/2002 | Czaplicki et al. | |
| 2004/0026960 A1 | 2/2004 | Czaplicki et al. | |
| 2004/0076831 A1 | 4/2004 | Hable et al. | |
| 2004/0201258 A1 | 10/2004 | Daniere et al. | |
| 2005/0081383 A1 | 4/2005 | Kosal et al. | |
| 2005/0127145 A1 | 6/2005 | Czaplicki et al. | |
| 2005/0194706 A1 | 9/2005 | Kosal et al. | |
| 2006/0272884 A1 * | 12/2006 | Vilcek | B29C 44/18 181/198 |
| 2010/0092733 A1 | 4/2010 | Blank et al. | |
| 2011/0189428 A1 | 8/2011 | Belpaire et al. | |
| 2011/0206890 A1 | 8/2011 | Belpaire et al. | |
| 2011/0236610 A1 | 9/2011 | Belpaire | |
| 2012/0141724 A1 | 6/2012 | Belpaire | |
| 2013/0181470 A1 | 7/2013 | LaNore et al. | |

FOREIGN PATENT DOCUMENTS

| | | |
|---|---|---|
| EP | 2154052 A1 | 2/2010 |
| EP | 2159136 A1 | 3/2010 |
| EP | 2159109 A1 | 3/2012 |
| EP | 2401191 B1 | 10/2013 |
| FR | 2 884 200 A | 10/2006 |
| WO | 00/55444 A1 | 9/2000 |
| WO | 01/42076 A1 | 6/2001 |
| WO | 2009080814 A1 | 7/2009 |

OTHER PUBLICATIONS

Co-pending U.S. Appl. No. 11/863,929, filed Sep. 28, 2007; Published as US 2009/0085379 dated Apr. 2, 2009; Patent Granted on Jun. 15, 2010 as U.S. Pat. No. 7,735,906.

* cited by examiner

REINFORCEMENT STRUCTURE AND METHOD EMPLOYING BULKHEADS

CLAIM OF PRIORITY

The present invention claims the benefit of the priority of the filing date of U.S. Provisional Application Ser. No. 60/982,565 filed Oct. 25, 2007 which are herein incorporated by reference for all purposes.

FIELD OF THE INVENTION

The present invention relates generally to reinforcement of structures, and more particularly to reinforcement of vehicle structures using expandable foam materials carried on a reinforcement support structure.

BACKGROUND OF THE INVENTION

Reinforcement of structures that have a cavity by insertion of a reinforcement device into the cavity is a popular approach employed in many applications. For some automotive vehicle applications, it has become popular in recent years to employ a structural foam as part of the reinforcement. See e.g., U.S. Pat. Nos. 7,111,899; 7,025,409; 6,920,693; 6,890,021; 6,467,384; and 5,884,960, all incorporated by reference.

Reinforcement of vehicle door assemblies and rockers traditionally has employed the placement of sheet metal bulkhead support members in a hollow cavity defined in a sill beam. See, e.g., U.S. Pat. Nos. 7,192,071; 6,053,564, incorporated by reference; see also, U.S. Pat. Nos. 7,147,272; and 6,354,656, incorporated by reference. This has commonly involved the manufacture of multiple stampings, and a labor intensive assembly process.

An example of a porous container through which polymeric material is foamed is described in published U.S. Patent Application Nos. 20050194706, and 20050081383, incorporated by reference.

Notwithstanding the above, there remains a need for improved reinforcement devices and processes, especially for use in structural reinforcement of automotive vehicles.

SUMMARY OF THE INVENTION

The present invention meets one or more of the above needs by the improved devices and methods described herein.

In one aspect, the present invention pertains to a structural reinforcement device for insertion into a cavity of a structure, comprising: a first reinforcement section having a first side and a generally opposing second side that has at least one projection of a first expandable polymeric material secured to it; and a separate second reinforcement section mated with the first reinforcement section, the second reinforcement section being configured to include at least one cavity, into which the at least one projection penetrates upon the mating, and at least one aperture defined therein through which the expandable material flows during expansion and where it will remain upon curing of the material, thereby causing the first reinforcement section to be coupled with the second reinforcement section, wherein the device is free of any separate local reinforcement components beyond that which exists from the first reinforcement section and the second reinforcement section.

The invention also contemplates such device in combination with one or more of the following features: the expandable material is a thermally expandable material that, upon exposure to heat at a predetermined temperature, expands and flows through the aperture, where it remains upon curing of the material, thereby coupling the first reinforcement section with the second reinforcement section; one or both of the first reinforcement section or the second reinforcement section is elongated; one or both of the first reinforcement section or the second reinforcement section has a generally constant profile; the profile of the first reinforcement section is generally planar and includes opposing edge portions; the profile of the second reinforcement section is generally undulating; the profile of the second reinforcement section includes opposing spaced apart surfaces that are aligned with opposing edge portions of the first reinforcement section upon completion of the mating step; the first reinforcement section and the second reinforcement section are further coupled by way of a second expandable material, which may have the same or different composition as the first expandable material; one or both of the first reinforcement section or the second reinforcement section includes at least one aperture for enabling location of the first reinforcement section and the second reinforcement section relative to each other; one or both of the first reinforcement section or the second reinforcement section is a deformed a metal sheet; the second reinforcement section includes at least two inwardly projecting integrally formed flaps, which are spaced apart from each other in a sufficient distance that the volume therebetween receives the at least one projection during the mating step, and which provide local reinforcement to resulting structural reinforcement device; upon expansion and curing of any thermally expandable material the first reinforcement section and the second reinforcement sections are mated to define a box structure having a plurality of, or all of, its sides adhesively bonded to each other; or the second reinforcement section includes a base wall, and a pair of opposing walls projecting outwardly away from the base wall that terminate at flanges that oppose the second side of the first reinforcement section, and the opposing side walls each include a plurality of flaps, each having a free end, which project from their respective side wall toward the other side wall, wherein a plurality of the alternating flaps of each of the side walls are longitudinally offset relative to each other, thereby defining a plurality of cavities into which a plurality of projections of the first expandable polymeric material penetrate upon the mating (which may also provide lateral structural reinforcement), and the flanges are adhered to the first reinforcement section by the second expandable polymeric material.

In another aspect the present invention contemplates a method for manufacturing a structural reinforcement device for insertion into a cavity of a structure, comprising the steps of providing a first reinforcement section having a first side and a generally opposing second side that has at least one projection of a first expandable polymeric material secured to it; mating the first reinforcement section with a separate second reinforcement section, the second reinforcement section being configured to include at least one cavity, into which the at least one projection penetrates upon the mating; and aligning the at least one projection with an aperture defined in the second elongated reinforcement section, so that when the thermally expandable polymeric material is subjected to a predetermined condition the material will expand and flow through the aperture, where it will remain upon curing of the material, thereby causing the first reinforcement section to be coupled with the second reinforcement section, wherein the method is free of a step of adding any separate local reinforcement components beyond that which exists from the first reinforcement section and the second reinforcement section. The methods herein may be free of any step of mechanically fastening the insert to a wall defining the cavity into which it is inserted.

Such method may employ one or any combination of the following features: the expandable material is a thermally expandable material and the method further comprises a step of heating the thermally expandable material to a predetermined temperature so that it expands and flows through the aperture, where it remains upon curing of the material, thereby coupling the first reinforcement section with the second reinforcement section; one or both of the first reinforcement section or the second reinforcement section is elongated; one or both of the first reinforcement section or the second reinforcement section has a generally constant profile; the profile of the first reinforcement section is generally planar and includes opposing edge portions; the profile of the second reinforcement section is generally undulating; the profile of the second reinforcement section includes opposing spaced apart surfaces that are aligned with opposing edge portions of the first reinforcement section upon completion of the mating step; the method further comprises a step of coupling the first reinforcement section and the second reinforcement section by way of a second expandable material, which may have the same or different composition as the first expandable material; one or both of the first reinforcement section or the second reinforcement section includes at least one aperture for enabling location of the first reinforcement section and the second reinforcement section relative to each other; the method further comprises a step of making one or both of the first reinforcement section or the second reinforcement section is made by deforming a metal sheet; the step of making one or both of the first reinforcement section or the second reinforcement section includes a step of forming at least two inwardly projecting flaps in the second reinforcement section, which are spaced apart from each other in a sufficient distance that the volume therebetween receives the at least one projection during the mating step, and which provide local reinforcement to resulting structural reinforcement device; upon expansion and curing of any thermally expandable material the first reinforcement section and the second reinforcement sections are mated to define a box structure having a plurality of, or all its sides adhesively bonded to each other; or any of the aforenoted steps are employed to define one of the structures described in the above summary of the device of the invention elsewhere in this written description.

DETAILED DESCRIPTION

Figure 1:
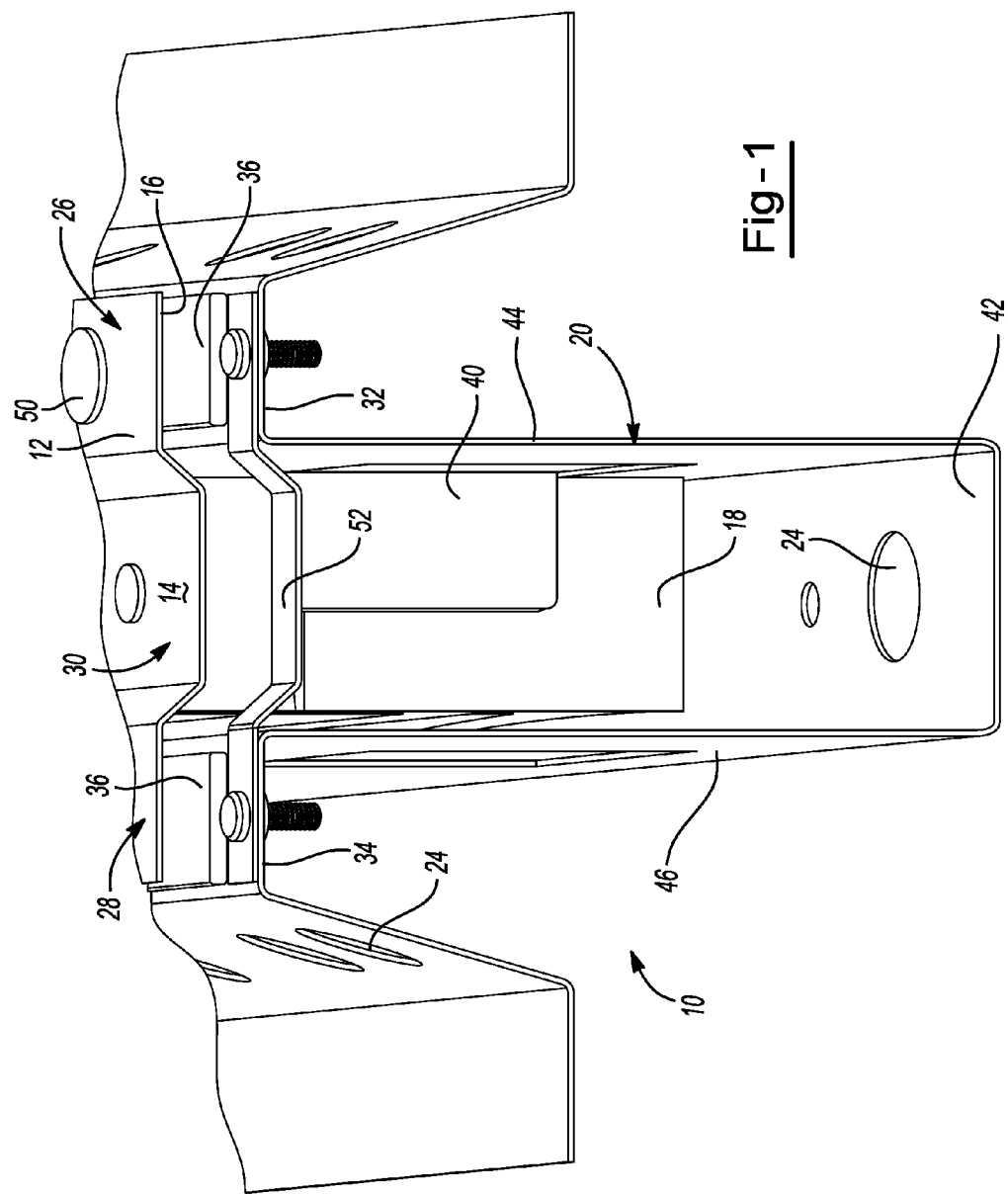
FIG. 1 is a perspective view taken from one end of an illustrative assembled device according to the present invention.

Reinforcement of vehicle structures generally involves placing carriers within a vehicle cavity and often including expandable materials with such carriers to further reinforce the structures. However, the shape and dimensions of every cavity are different from vehicle to vehicle which often requires that the carriers undergo extensive secondary processing in an effort to customize the size and fit to a particular vehicle and/or a particular vehicle cavity.

The present invention provides a tunable spine structure such that the configuration of a common carrier can be easily adjusted through the use of expandable materials to adapt for fit within a cavity of a structure to be reinforced. Reinforcements are generally fitted with additional steel stampings through secondary processing and/or welding to adjust for fit within a cavity. The present invention eliminates the need for additional processing and materials thereby reducing the overall weight of the spine structure and reducing the time required to adequately reinforce a structure. Through the use of expandable materials, the present invention is capable of providing a carrier that imparts support and stabilization for all walls of a cavity with no need for secondary processing. The present invention is further capable of attaching one or more carriers to each other through the use of aptly placed apertures and projections of expandable materials.

It is seen that the present invention contemplates methods and devices for structural reinforcement. In practice, these devices are placed in a cavity of a structure to be reinforced and are activated for causing an expandable polymeric material to expand and at least partially fill the cavity. Preferably, upon curing, the polymeric material also forms an adhesive bond that attaches the reinforcement device to surrounding structure that defines the cavity. General examples of such reinforcement techniques are disclosed, by way of example in U.S. Pat. Nos. 7,111,899; 7,025,409; 6,920,693; 6,890,021; 6,467,384; 5,884,960, hereby incorporated by reference.

With reference to FIGS. 1 through 5, in accordance with the present invention, an improved technique and resulting assembly is provided, pursuant to which a reinforcement device 10 having attractive characteristics is realized. The device 10 includes a first reinforcement section 12 having a first side 14 and a generally opposing second side 16 that has at least one projection 18 of a first expandable polymeric material secured to it, and a separate second reinforcement section 20 mated with the first reinforcement section. The second reinforcement section 20 is configured to include at least one cavity 22 (see FIG. 5), into which the at least one projection 18 penetrates upon the mating, and optionally at least one aperture (examples are illustrated in the drawings with reference numeral 24) defined therein through which the expandable material may flow during expansion and where it will remain upon curing of the material. As a result, the first reinforcement section 12 can be coupled with the second reinforcement section 20 as a result of such expandable material. It is also possible to omit the at least one aperture. Preferably, though not necessarily, the device is free of any separate local reinforcement components beyond that which exists from the first reinforcement section and the second reinforcement section.

As seen from the drawings, one or both of the first reinforcement section 12 or the second reinforcement section 20 may be elongated. One or both of the first reinforcement section 12 or the second reinforcement section 20 may have a generally constant profile. For example, the profile of the first reinforcement section 12 is generally planar and includes opposing edge portions 26 and 28. As shown in the drawings, the edge portions may lie in a different plane relative to an interior portion 30. The edge portions 26 and 28 may lie in a different plane relative to each other. Though shown as generally flat, any of the portions 26, 28 or 30 of the first reinforcement section may be arcuate.

The profile of the second reinforcement section 20 is generally undulating. The profile of the second reinforcement section includes opposing spaced apart surfaces 32 and 34 that are aligned with opposing edge portions 26 and 28 of the first reinforcement section 12 upon completion of the mating step. The first reinforcement section 12 and the second reinforcement section 20 may further be coupled by way of a second expandable polymeric material 36, which may have the same or different composition as the first expandable polymeric material.

Figure 2:
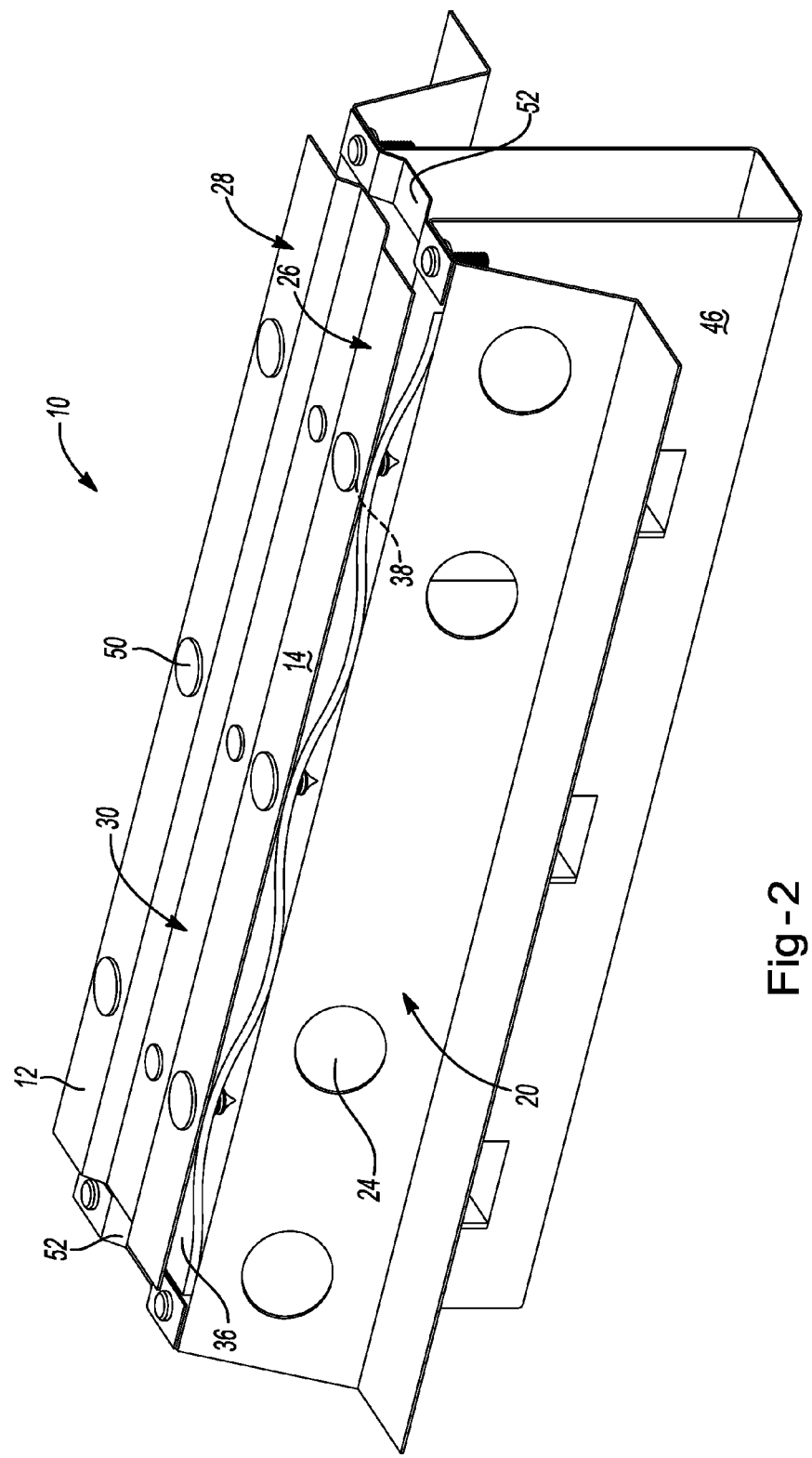
FIG. 2 is a perspective view taken from a side of the illustrative assembled device of FIG. 1.
Figure 3:
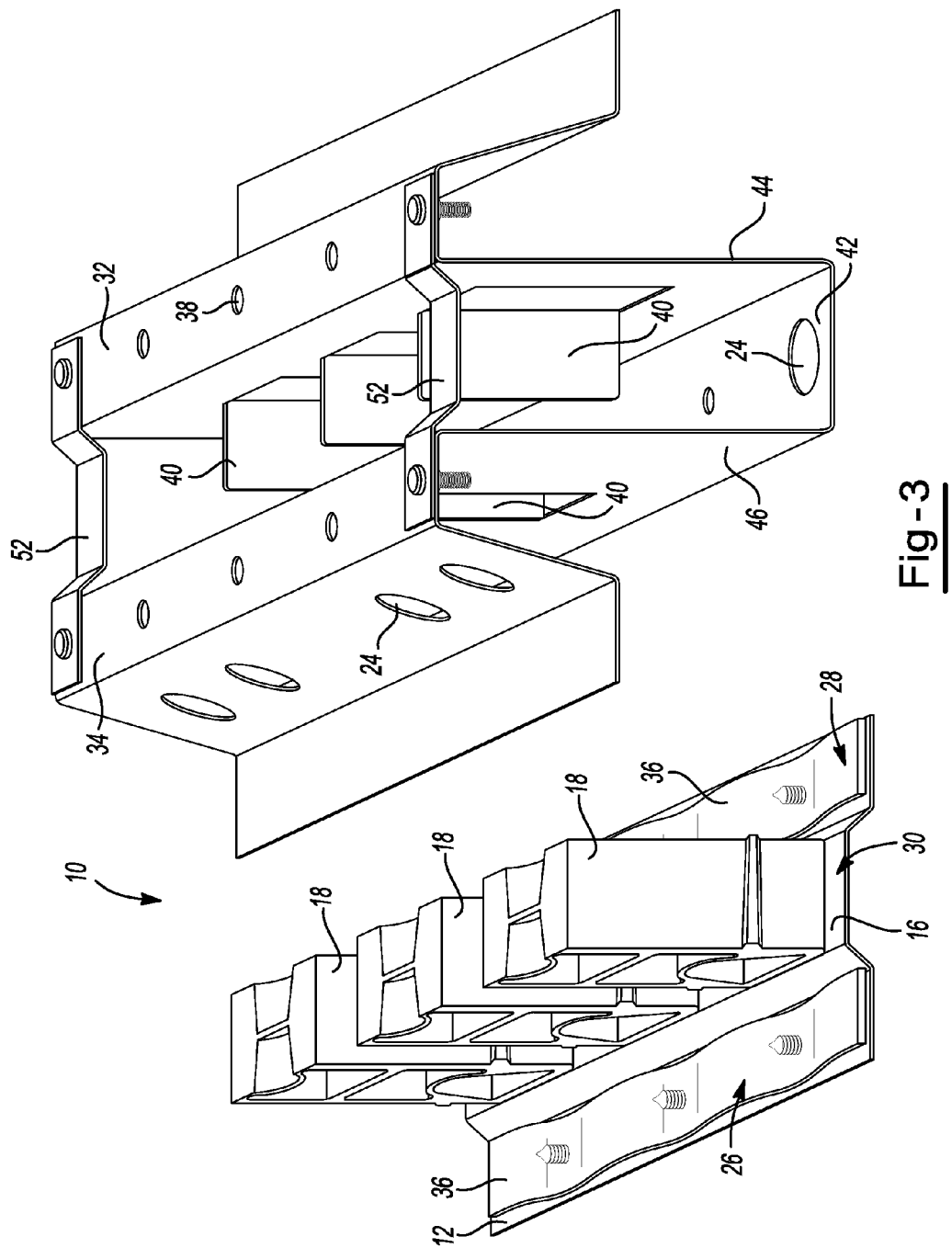
FIG. 3 is a view of the device of FIG. 1 showing first and second reinforcement sections separated from each other.
Figure 5:
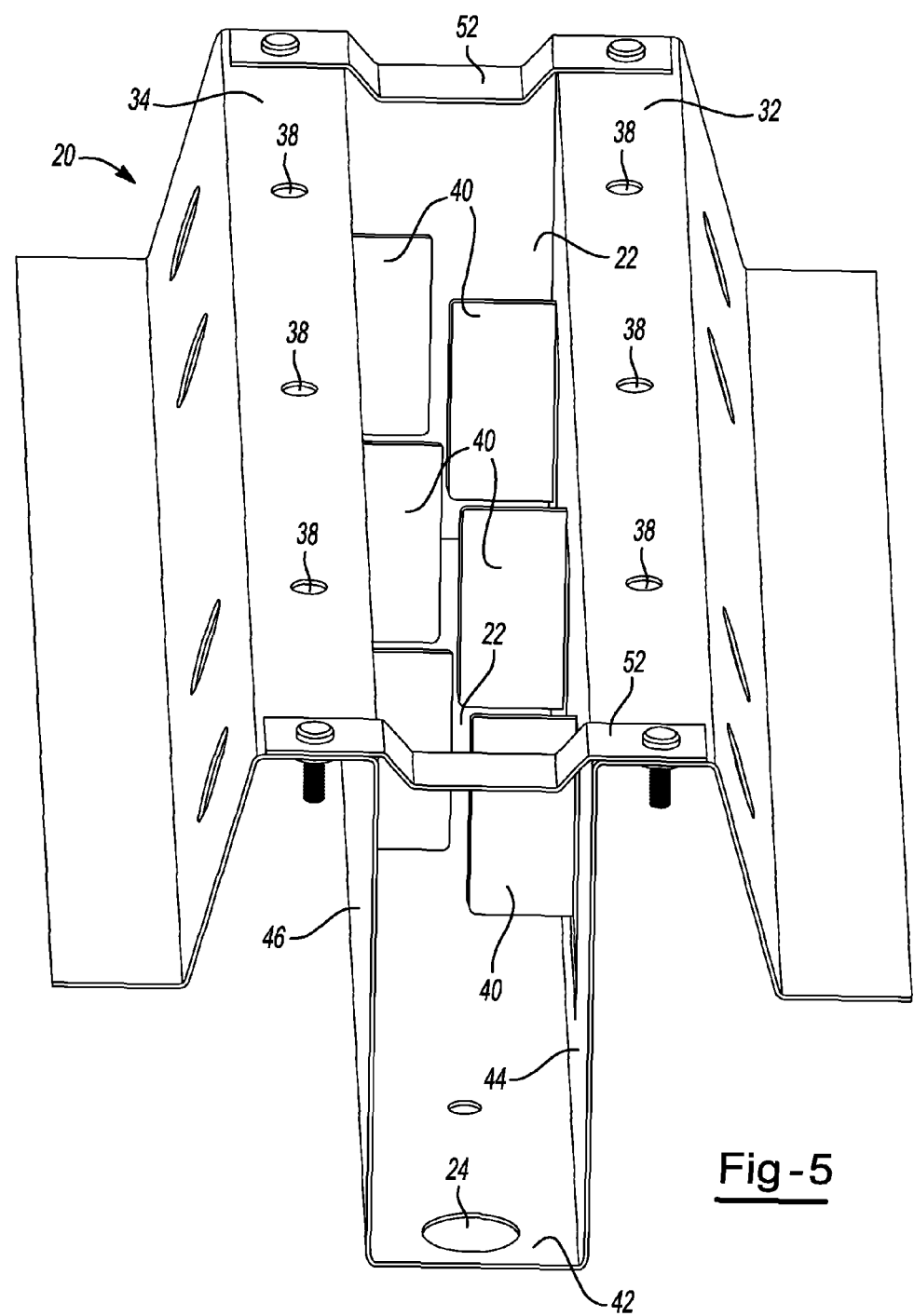
FIG. 5 is an overhead perspective view of the second reinforcement section of FIG. 1.

As illustrated (without limitation) in FIGS. 2, 3 and 5, one or both of the first reinforcement section 12 or the second reinforcement section 20 may include at least one aperture 38 (e.g., in one or both of surfaces 32 or 34) for enabling location of the first reinforcement section and the second reinforcement section relative to each other. In a particularly preferred embodiment, one or both of the first reinforcement section or the second reinforcement section is a deformed a metal sheet. For example, one or both sections may be rolled, formed, stamped (e.g., with progression) or a combination of both. One or both may also be cast metal or injection molded (plastic or metal). Secondary operations, such as punching, piercing may be employed for achieving specific structural features.

In a preferred embodiment, the second reinforcement section 20 includes an integral bulkhead reinforcement structure. For instance, referring to FIGS. 3 and 5, it may include at least two inwardly projecting integrally formed flaps 40, which are spaced apart from each other in a sufficient distance that the volume therebetween receives the at least one projection during the mating step, and which provide local reinforcement to resulting structural reinforcement device. More preferably, the second reinforcement section 20 includes a base wall 42, and a pair of opposing walls 44 and 46 projecting outwardly away from the base wall that terminate at one or more flanges that oppose the second side of the first reinforcement section, which may be the same as the opposing spaced apart surfaces 32 and 34, as depicted in the drawings. Though it may be possible to realize a similar structure with flaps 40 on only one of the side walls, preferably the opposing side walls 44 and 46 each include a plurality of flaps 40, each having a free end, which project from their respective side wall toward the other side wall. These effectively can co-act as beams for resisting loading and providing reinforcement. In a preferred embodiment, as shown in FIGS. 1, 3 and 5, a plurality of the alternating flaps 40 of each of the side walls are longitudinally offset or otherwise staggered relative to each other, thereby defining at least one cavity and preferably a plurality of cavities 22 into which a plurality of projections 18 of the first expandable polymeric material penetrate upon the mating. One or both of the flanges are adhered to the first reinforcement section by the second expandable polymeric material 36. Upon expansion and curing of any thermally expandable material, the first reinforcement section and the second reinforcement sections are mated to define a box structure, as illustrated in FIG. 2, which will have all of its sides adhesively bonded to each other. It can be seen that the flaps serve to resist deformation. For example, one approach is to stagger the flaps so that the free end is generally opposite a solid wall portion of the opposite side wall 44 or 46. In this manner, in response to a load (e.g., from an impact) the flap of one wall will advance toward the opposite wall where it will contact the solid portion and co-act with it to help manage the distribution of the load.

By way of illustration, one possible process for making the devices herein will include the steps of providing the first reinforcement section with the at least one projection of a first expandable polymeric material secured to it. It is mated with the separate second reinforcement section in such a way that the at least one projection penetrates the cavity 22 upon the mating. Desirably the at least one projection 18 is aligned with at least one aperture 24 defined in the second elongated reinforcement section, so that when the thermally expandable polymeric material is subjected to a predetermined condition (e.g., heat activated) the material will expand and flow through the aperture, where it will remain upon curing of the material, thereby causing the first reinforcement section to be coupled with the second reinforcement section. Desirably, the method will be free of a step of adding any separate local reinforcement components beyond that which exists from the first reinforcement section and the second reinforcement section.

Such method may employ one or more additional steps. For example, one or both of the first or second reinforcement sections may be formed, such as by deforming a metal sheet, and preferably a deforming operation that includes stamping a metal, roll-forming a metal, or both. The first reinforcement section also may be extruded, cast or injection molded. Though preferably being metal, either or both of the first of second reinforcement sections may be made of another material, such as a polymeric material, or a composite. As such, the methods herein contemplate that such sections may be made from a suitable shaping operation (e.g., molding, extruding, casting or otherwise). During the deforming step it is contemplated that the flaps will be made from the sheet metal of the second reinforcement section. Flaps, apertures or both may be made by suitable deforming operations (e.g., punching, piercing or both).

The expandable polymeric material may be any suitable polymeric material capable of expansion and adhesively bonding to a substrate upon curing. Illustrative materials are described in U.S. Pat. Nos. 5,884,960; 6,348,513; 6,368,438; 6,811,864; 7,125,461; 7,249,415; published U.S. Application No. 20040076831, incorporated by reference. Desirably, the materials are provided as a solid mass of a one component material. The materials may be expanded by exposure to one or more of heat or some other activating condition such as moisture, light, electromagnetic radiation, or the like). In one preferred approach, the material is expanded during heating in a bake oven associated with a step of coating a vehicle, such as during a step of baking a structure immediately following deposition of a corrosion resistant layer known in the art as e-coat.

One preferred approach is to employ for at least one of the expandable materials to have a substantially constant profile, such as obtained in an extruded form of the material, as described in U.S. Pat. No. 7,249,415, hereby incorporated by reference. The expandable material may have a fastener integrally formed thereon, or attached thereto. The expandable material may be molded or include a combination of two or more materials. See, e.g., U.S. Pat. No. 6,422,575, hereby incorporated by reference.

In applications where a heat activated, thermally expanding material is employed, an important consideration involved with the selection and formulation of the expandable material is the temperature at which a material reaction or expansion, and possibly curing, will take place. For instance, in most applications, it is undesirable for the material to be reactive at room temperature or otherwise at the ambient temperature in a production line environment. More typically, the polymeric material becomes reactive at higher processing temperatures, such as those encountered in an automobile assembly plant, when the material is processed along with the automobile components at elevated temperatures or at higher applied energy levels, e.g., during painting preparation steps. Temperatures employed may be in the range of about 145° C. to about 200° C., or possibly slightly higher. If needed, blowing agent activators can be incorporated into the composition to cause expansion at different temperatures outside the above ranges.

Generally, suitable expandable polymeric materials may have a range of expansion ranging from approximately 0 to over 1000 percent. The level of expansion may be as high as 1500 percent or more. The resulting expanded polymeric foam material may possess high compression strength and flexural modulus rigidity characteristics (e.g., 1) a compressive strength according to ASTM D-1621-00 of at least about 0.3 MPa, more preferably at least about 0.5 MPa, still more preferably at least about 1 MPa, and even still more preferably at least about 3 MPa; 2) a compressive modulus according to ASTM D-1621-00 of at least about 10 MPa, and more preferably at least about 20 MPa; or 3) both (1) and (2)), such as those consistent with what are regarded in the art as structural foams. Softer or less rigid foams may also be employed.

Preferably, the expandable material is substantially tack free to the touch at room temperature. One such material is an epoxy based resin. Other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Materials expandable to form an acoustical foam may be employed. Sealant materials may be employed, such as those in U.S. Pat. No. 7,199,165, incorporated by reference. Accordingly, the polymeric materials may includes an acrylate, an acetate (e.g., ethylene vinyl acetate), an elastomer or a combination thereof. The polymeric materials may include a reinforcement or filler selected from one or more of carbon fibers, glass fibers, nylon fibers or aramid pulp.

Figure 4:
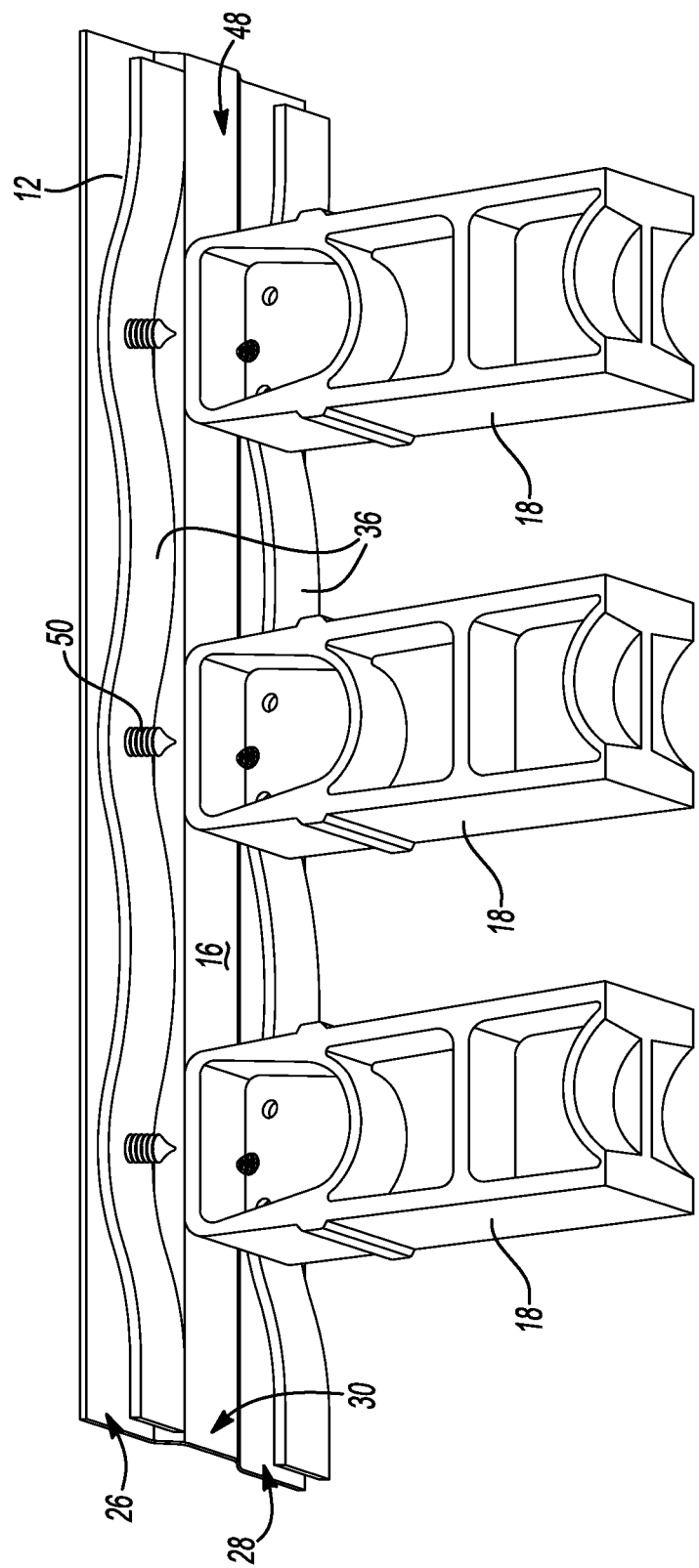
FIG. 4 is a side perspective view of the first reinforcement section of FIG. 1 with a plurality of projections of thermally expandable material.

Though a highly preferred embodiment herein is to couple the first reinforcement section with the second reinforcement section, it is also contemplated that the reinforcement sections may be employed individually in some applications, independent from each other. For example, a structural reinforcement device may comprise or consist essentially of a first reinforcement section, such as one employing features of the embodiment of FIG. 4. Specifically, it would include a spine member 48 (e.g., the metal plate of FIG. 4) including the first side 14 and the second side 16 (illustrated as being substantially parallel to the first side) onto which one or more projections 18 of the expandable polymeric material may be secured, such as by a mechanical attachment, by an adhesive bond or both. The projections may be of the same or different size, shape, or material relative to each other. The first or the second face may also carry a second expandable polymeric material, such as the depicted strips 36 along its edge portions, as shown in FIG. 4. The second expandable material may have a substantially constant profile, or a profile that varies along its length. The second expandable polymeric material also may be secured, such as by a mechanical attachment, by an adhesive bond or both. The invention thus also envisions the insertion of the first reinforcement section into a cavity (e.g., one that excludes the second reinforcement section described herein), and expansion of the expandable polymeric material of the reinforcement section to at least partially fill the cavity, in accordance with the teachings herein. As can be appreciated, the embodiment of the drawings illustrates optional push-pin fasteners 50 for facilitating locating (which may include connecting) of the first reinforcement section with the second reinforcement section, such as by penetration through one or more of the apertures 38. Other structures may be employed such as tabs formed from the material of the first reinforcement section.

FIGS. 1, 2, 3 and 5 also illustrate an optional strap 52 for connecting the opposing sides of the second reinforcement section. It is depicted as a separate piece that is attached (e.g., fastened) to the second reinforcement section. It may also be formed at least partially integrally with the second reinforcement section.

Accordingly it is possible to selectively tune the desired reinforcement characteristics for a particular application. The ability to use a common spine member to carry the respective projections also helps improve overall manufacturing efficiencies. For example, a plurality of spines each having generally the same shape, size and material may be manufactured in a batch or otherwise stockpiled. Thereafter, individual spines of the batch are deployed for different applications relative to each other, by securing to them expandable materials precisely tailored in size, shape and material, to meet the needs of the intended application.

Though the devices herein have various applications, one preferred application is to structurally reinforce a rocker of an automotive vehicle. The device is placed in a cavity of the vehicle body structure that defines the rocker prior to (or possibly after) a step of e-coating. After e-coating, it is subjected to heat in a bake oven used to cure the e-coat, where the expandable polymeric material expands for coupling the sections of the device and adhering it to the vehicle body. Other automotive vehicle applications, where corresponding steps are performed include (without limitation) pillar reinforcement, roof reinforcement, frame rail reinforcement, radiator support beam reinforcement, powertrain support or component reinforcement, vehicle beltline reinforcement, reinforcement of pillar to door regions, roof to pillar, mid-pillar, roof rails, windshield or other window frames, deck lids, hatches, removable top to roof locations, other vehicle beltline locations, motor rails, lower sills, cross members, lower rails, and the like. Moreover, vehicle roof tops may be reinforced to support additional loads in accordance with the present invention. For all of these applications, the process described herein may be employed, being adapted to take into account the specific structural modifications necessary to address the appropriate geometry of the intended application.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A method for manufacturing a structural reinforcement device for insertion into a cavity of a structure, comprising the steps of:
   a) providing a first reinforcement section having a first side and a generally opposing second side that has at least one projection of a first expandable polymeric material secured to it;
   b) mating the first reinforcement section with a separate second reinforcement section, the second reinforcement section being configured to include at least one cavity, into which the at least one projection penetrates upon the mating; and
   c) aligning the at least one projection with an aperture defined in the second elongated reinforcement section, so that when the expandable polymeric material is subjected to a predetermined condition the expandable polymeric material will expand and flow through the aperture, where it will remain upon curing of the expandable polymeric material, thereby causing the first reinforcement section to be coupled with the second reinforcement section, wherein the method is free of a step of adding any separate local reinforcement components beyond that which exists from the first reinforcement section and the second reinforcement section;
   wherein the second side of the first reinforcement section is a common spine member for the at least one projection; and
   wherein reinforcement characteristics are selectively tuned by selecting a desired size, shape, and material of the at least one projection and securing the at least one projection to the common spine member.

2. The method of claim 1, wherein the expandable material is a thermally expandable material and the method further comprises a step of heating the thermally expandable material to a predetermined temperature so that it expands and flows through the aperture, where it remains upon curing of the material, thereby coupling the first reinforcement section with the second reinforcement section.

3. The method of claim 1, wherein one or both of the first reinforcement section or the second reinforcement section is elongated.

4. The method of claim 1, wherein the profile of the first reinforcement section is generally planar and includes opposing edge portions.

5. The method of claim 1, wherein the profile of the second reinforcement section is generally undulating.

6. The method of claim 4, wherein the profile of the second reinforcement section includes opposing spaced apart surfaces that are aligned with the opposing edge portions of the first reinforcement section upon completion of the mating step.

7. The method of claim 1, further comprising a step of coupling the first reinforcement section and the second reinforcement section by way of a second expandable material, which may have the same or different composition as the first expandable material.

8. The method of claim 2, further comprising a step of coupling the first reinforcement section and the second reinforcement section by way of a second expandable material, which may have the same or different composition as the first expandable material.

9. The method of claim 7, further comprising a step of coupling the first reinforcement section and the second reinforcement section by way of a second expandable material, which may have the same or different composition as the first expandable material.

10. The method of claim 1, wherein one or both of the first reinforcement section or the second reinforcement section includes at least one aperture for enabling location of the first reinforcement section and the second reinforcement section relative to each other.

11. The method of claim 7, wherein one or both of the first reinforcement section or the second reinforcement section includes at least one aperture for enabling location of the first reinforcement section and the second reinforcement section relative to each other.

12. The method of claim 1, wherein the step of making one or both of the first reinforcement section or the second reinforcement section includes a step of forming at least two inwardly projecting flaps in the second reinforcement section, which are spaced apart from each other in a sufficient distance that the volume therebetween receives the at least one projection during the mating step, and which provide local reinforcement to resulting structural reinforcement device.

13. The method of claim 9, wherein the step of making one or both of the first reinforcement section or the second reinforcement section includes a step of forming at least two inwardly projecting flaps in the second reinforcement section, which are spaced apart from each other in a sufficient distance that the volume therebetween receives the at least one projection during the mating step, and which provide local reinforcement to resulting structural reinforcement device.

14. The method of claim 2, wherein upon expansion and curing of the thermally expandable material the first reinforcement section and the second reinforcement sections are mated to define a box structure having all of its sides adhesively bonded to each other.

15. The method of claim 1, wherein the first reinforcement section and the second reinforcement section are further coupled by way of a second expandable material, which may have the same or different composition as the first expandable material.

16. The method of claim 1, wherein the second reinforcement section includes a base wall, and a pair of opposing walls projecting outwardly away from the base wall that terminate at flanges that oppose the second side of the first reinforcement section, and the opposing side walls each include a plurality of flaps, each having a free end, which project from their respective side wall toward the other side wall, wherein a plurality of the alternating flaps of each of the side walls are longitudinally offset relative to each other, thereby defining a plurality of cavities into which a plurality of projections of the first expandable polymeric material penetrate upon the mating, and the flanges are adhered to the first reinforcement section by the second expandable polymeric material.

17. The method of claim 1, wherein the first thermally expandable polymeric material is extruded to have a substantially constant profile.

18. The method of claim 1, wherein the opposing edge portions of the first reinforcement section lie on different planes relative to each other.

19. The method of claim 1, wherein the first thermally expandable polymeric material is tack free at room temperature and substantially dry when contacted.

20. The method of claim 1, wherein the common spine member is manufactured in bulk and selected from a batch prior to securing a desired shape of the at least one projection to the common spine.

* * * * *